March 1, 1927.
J. R. GAMMETER
1,619,019
TIRE BUILDING METHOD AND APPARATUS
Filed July 11, 1922      2 Sheets-Sheet 1
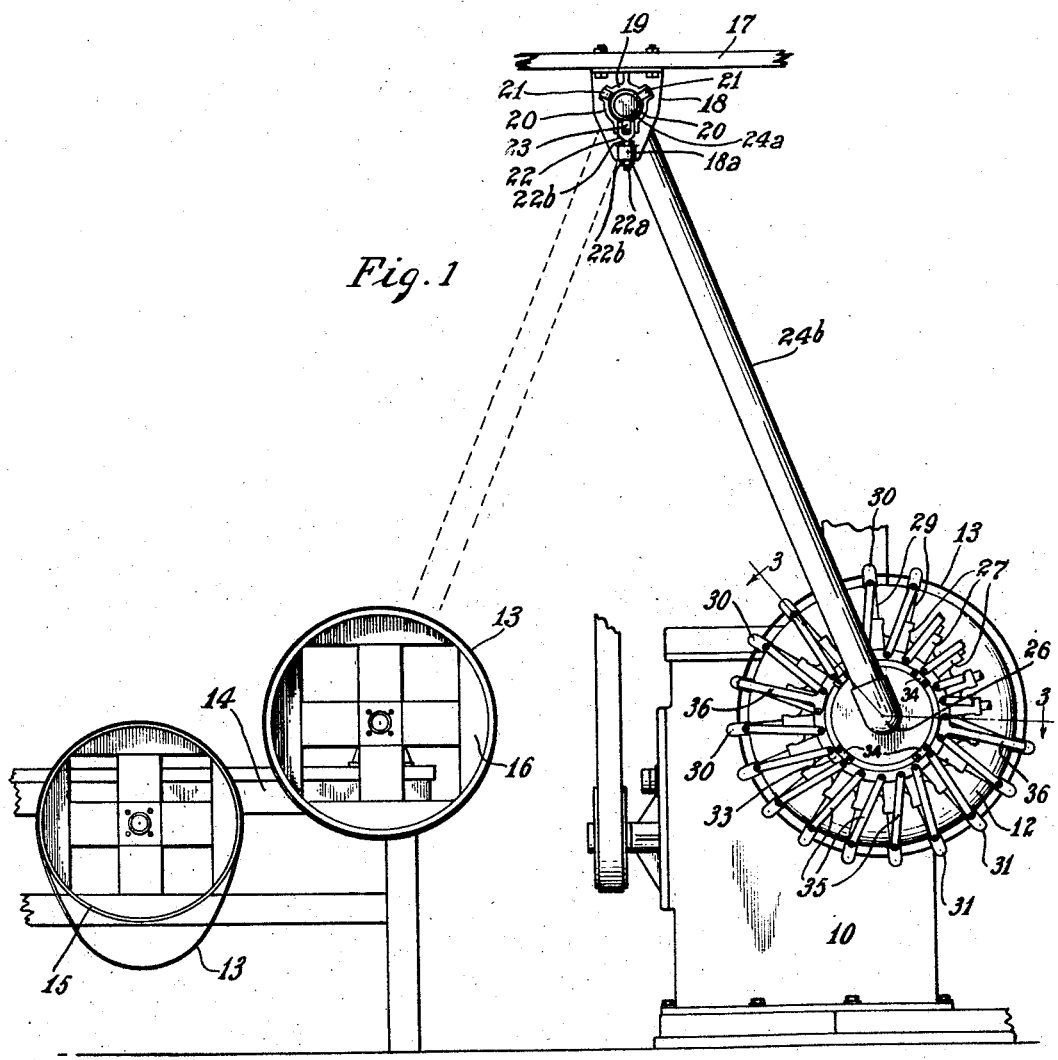
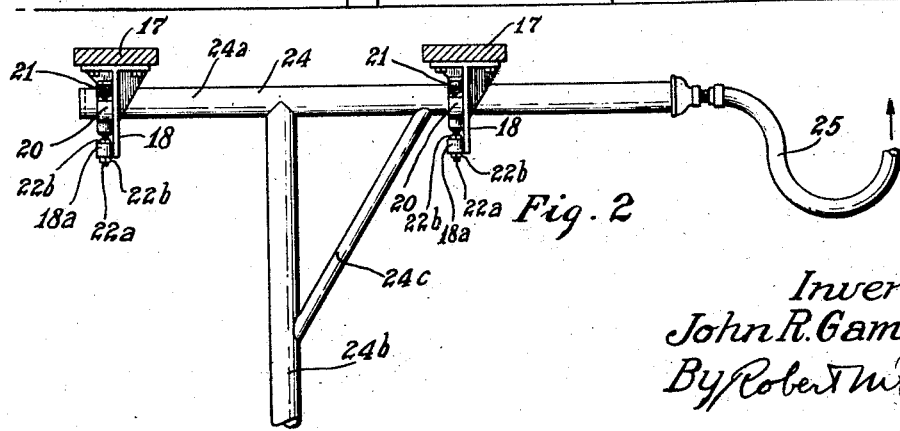
Inventor
John R. Gammeter
By Robert M. Pierson
Atty.

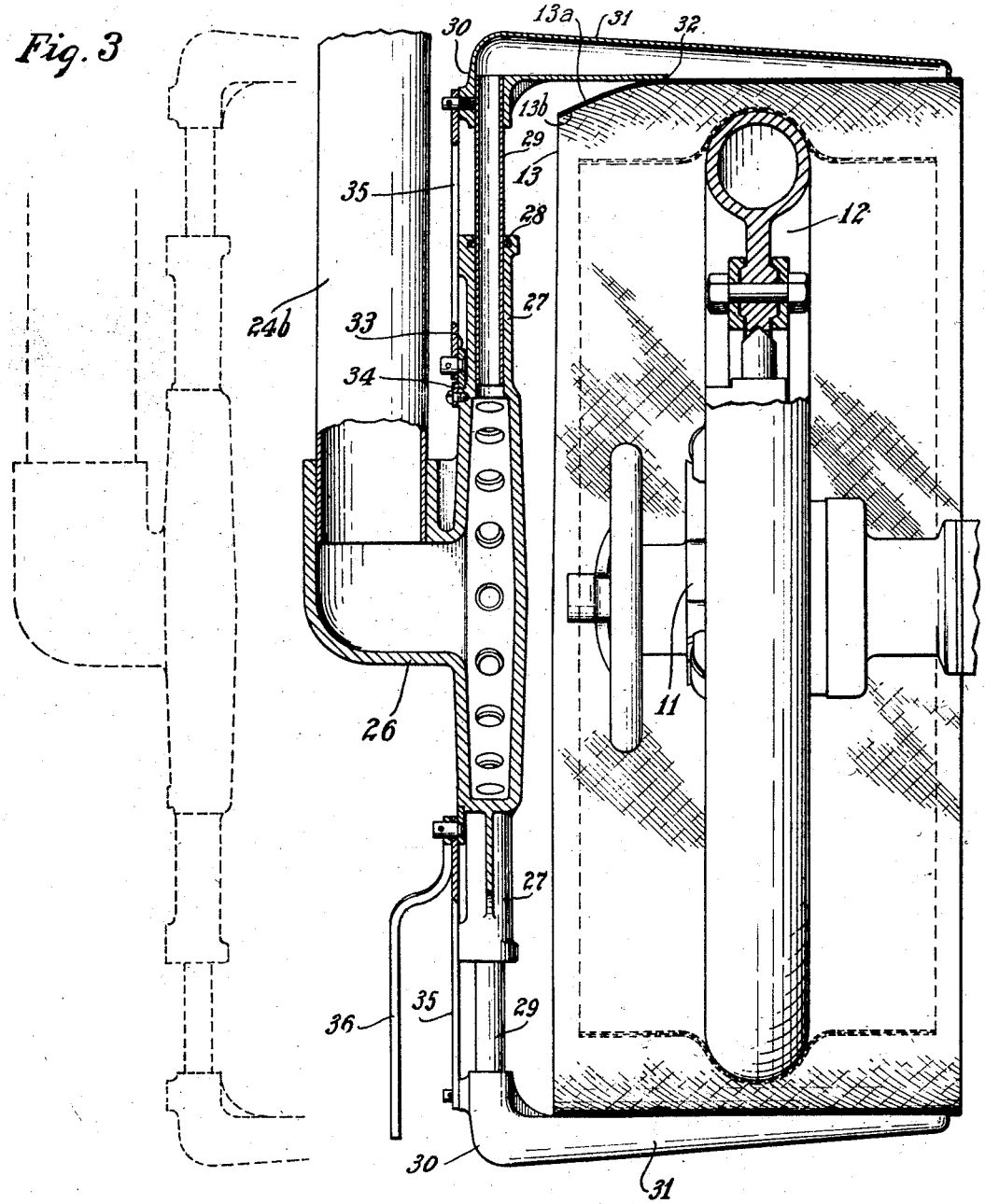

Patented Mar. 1, 1927.

1,619,019

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

TIRE-BUILDING METHOD AND APPARATUS.

Application filed July 11, 1922. Serial No. 574,227.

This invention relates to methods and apparatus for building pneumatic tires wherein the cord or other rubberized fabric is first made up into an endless band and the band then mounted upon a tire-support such as an annular tire-building core or other structure adapted to support the endless band while the latter is being laterally shaped.

Heretofore, so far as I am aware, the endless bands, in actual practice, have been stretched onto the support or core by hand, requiring considerable muscular effort in the necessary stretching of the band, and in the hand method difficulties are encountered in the accurate placing of the band upon the core and in procuring uniformity of tension throughout the circumference of the band, particularly because the band, being sufficiently tacky to be held adhesively to form when pressed about the core, adheres to the core or a previously laid band, where it first touches, and the stretching of the band by hand necessitates that it be first mounted on one side of the core's circumference and then pulled over the rest of the core.

My chief objects are to provide improved apparatus and procedure by which time and effort may be saved in the mounting of the bands, and, by accurately positioning the band upon its support with substantially uniform tension throughout its circumference, to obtain an improved product. A more specific object is to deposit the band initially in its proper position upon its support, so as substantially to avoid the necessity of shifting it after it has been mounted.

Of the accompanying drawings:

Fig. 1 is an elevation of a preferred form of apparatus embodying and adapted to carry out my invention.

Fig. 2 is a sectional view, from the right of Fig. 1, of a part of the apparatus.

Fig. 3 is a section on line 3—3 of Fig. 1.

Referring to the drawings, 10 represents a tire building machine of any suitable type comprising a core-supporting chuck 11 and means for rotating the same. 12 is a known type of tire-building core, mounted upon said chuck, upon which a tire-band 13 is to be mounted under tension in the building of the tire.

In practicing my invention the tire band 13 preferably consists of two plies of bias-cut, rubberized cord fabric, $13^a$, $13^b$ (Fig. 3), having their strength-giving cords or threads running obliquely, the cords of each ply crossing those of the other. The two plies are stuck together and the ends of each joined together so as to form the endless, double-ply band before being applied to the tire-building core, and to facilitate the operation of so building up the endless band I provide, near the tire building machine 10, a work table 14 having mounted thereon on horizontal axes and overhanging therefrom, a rotatable band-building drum 15, substantially smaller than the band to be built, on which the latter may conveniently be made up, and a rotatable band-supporting drum 16 which has approximately the same circumference as the band and is thus adapted to support the latter in substantially circular form.

The band-supporting drum 16 preferably is substantially aligned edgewise with the tire-buiding core 12 on its chuck 11, and secured to an overhead support 17 is a pair of depending, apertured brackets 18, 18 so positioned that the common axis of their apertures is substantially parallel to and equidistant from the axes of the chuck 11 and the drum 16.

Journaled between flanges 19, 20, 20 on each of the brackets are rollers 21, 21, their tread portions extending into the aperture of the bracket, and the lower end portions of the flanges 20 constitute a guideway for a fork 22 having a threaded stem $22^a$ adjustably secured by nuts $22^b$, $22^b$, in a tapped projection, $18^a$, from the bracket. Journaled between the arms of said fork is a roller 23, which, being mounted as described, may be adjusted from and toward the axis of the aperture of the bracket 18, the rollers 21 and the roller 23 of the respective brackets being thus adapted to serve as an anti-friction guide for a pipe structure 24 having one of its members, $24^a$, mounted in the apertures of said brackets. Said pipe structure is adapted to be run backward and forward in said guideway, and to be turned laterally about the member $24^a$ as an axis. The nearer end of the pipe member $24^a$, as viewed in Fig. 1, is closed and to the opposite end is attached a flexible suction pipe 25 adapted to exhaust the air from the pipe structure and provided with means (not shown) for breaking the vacuum in said structure. The latter includes a depending pipe 24ᵇ communicating with the member 24ᵃ, and 24ᶜ is a diagonal brace between the two.

On the lower end of the depending pipe 24ᵇ is a hollow hub-member 26 in communication with said pipe, its axis being transverse to said pipe, and the latter being of such length that the axis of said hub-member may be brought into coincidence with the axis of the band-supporting drum 16 or the chuck 11 as the pipe structure 24 is swung about its brackets 18.

The hollow hub member 26 is formed with radiating sleeves 27, 27 each provided near its outer end with a packing ring 28 set in a groove in the inner wall of the sleeve. Slidably mounted in each of said sleeves is a pipe 29 constituting the shank of an L-shaped suction member 30 of which the other arm, 31, overhangs, extending away from the pipe 24ᵇ, and preferably parallel with the axes of the hub-member 26, band-supporting drum 16 and chuck 11. Each arm 31 is formed with a suction aperture 32 on its face nearest the axis of said hub-member, the several arms being thus adapted to hold the tire band 13 in substantially circular form by suction. The sleeve 27, packing 28 and pipe 29 constitute a slip-joint, permitting the movement of the several L-shaped suction members 30 from and toward the axis of the hub-member 26 while a vacuum is maintained within them.

For so moving said suction members 30 I provide a ring 33 rotatably mounted upon a shoulder formed upon the hub-member 26 and retained thereon by clamping plates 34, 34. Connecting each of the suction members 30 with said ring is a toggle link 35 preferably of such length that its mechanical advantage will be substantially at its maximum, the link being approximately parallel with the shank of its respective suction member, and thus at dead-center, when the suction member has been forced to its outermost position by turning the ring 33 upon the hub member 26. For so turning said ring, I provide a pair of diametrically opposite handles or levers 36, 36 projecting radially therefrom, said handles as here shown being mounted upon the pivot pins at the inner ends of adjacent links 35.

In practicing my method by means of the apparatus here shown, the band 13, of less circumference than the core 12, is built upon the drum 15 and then removed therefrom and mounted upon the band-supporting drum 16, which holds it in substantially circular form. By suitable gauges, not shown, or a ruler, successive bands may be given the same position, axially, upon said drum. The pipe structure 24 is then run in its brackets to the left as viewed in Fig. 2 and swung transversely to bring the axis of the hub-member 26 into alignment with that of the drum 16. The vacuum in the device being broken, the ring 33 is turned by means of the levers 36, clockwise as viewed in Fig. 1, to force the suction members 30 radially outward and so open up the space surrounded by their overhanging arms 31. The pipe structure is then run toward the drum 16, until the arms 31 surround the band 13 on said drum with their suction apertures 32 lying within the width of said band. Suitable gauges, not shown, may be employed to stop the hub-member 26 at the same position with respect to successive bands.

The ring 33 is then turned counter-clockwise as viewed in Fig. 1, drawing the suction arms 31 radially inward, until they contact the band, suction is applied to the device through the flexible pipe 25, sucking the band at intervals about its circumference against the arms 31, and the ring 33 is turned in the opposite direction to stretch the band, the latter being held out against the suction arms, as they move outward, by atmospheric pressure, said ring being turned until the links 36 are at dead center, at radial positions, the handles or levers 36 may be released without the suction arms being forced inward by the reaction of the band. I do not wholly limit my claims, however, to this dead center effect for holding the band stretched.

The pipe structure 24 is then run away from the drum 16, to clear the suction arms 31 and band 13 from said drum, swung over to the chuck 11 and core 12 thereon, and run toward the latter until the band 13, held expanded by the suction arms, is in the desired axial position with respect to the core, substantially as shown in Fig. 3, the operator depending upon his eye or measurement with a suitable gauge, for the accurate positioning of the band. The suction arms preferably are then retracted, until the band is at or near the crown of the core throughout its circumference, and the vacuum is then broken, permitting the band to contact upon the core, where, being normally smaller in circumference than the core, it assumes substantially the cross-sectional form shown in dotted lines in Fig. 3, automatically fitting itself over the crown of the core. The band-transferring device is then withdrawn and the band further shaped about the core as in the usual practice when the band is stretched onto the core by hand.

The band being engaged only by its outer surface, leaving its inner surface unobstructed, permits the mounting of the band upon the core with substantially less stretching than is required where the band is stretched by members engaging its inner face, and the difficulty and obvious disadvantages of removing members from between the core and the band after the latter has been permitted to contract are obviated.

While I have shown and described a preferred embodiment of my invention in which vacuum means are employed for stretching the band, various modifications may be resorted to within the scope of my invention, and I do not desire to limit my claims wholly to that feature, nor otherwise to limit it except as required by the prior art.

I claim:

1. The method of building tires which comprises forming an endless band of stretchable tire-building material, stretching said band circumferentially by applying suction to its outer face at longitudinal intervals thereon and then moving the suction-applying means outward, placing the band thus stretched about a tire-forming support, and breaking the suction to permit said band to contract on said support.

2. The method of building tires which comprises forming an endless band of stretchable tire-building material, stretching said band circumferentially by applying suction to its outer face at longitudinal intervals thereon and then moving the suction-applying means outward, placing the band thus stretched about a tire-forming support, permitting said suction-applying means to yield to the tension of the band, and breaking the suction to permit said band to contract on said support.

3. The method of building tires which comprises forming an endless, cross-sectionally flat band of tire-building material, stretching said band circumferentially by applying mechanically-produced forces to its outer face only, leaving its inner face unobstructed, while maintaining it substantially flat in cross-section and substantially circular in form, and releasing said stretched band upon a form of substantially greater circumference than the normal circumference of the band, so that the contraction of the band shapes it laterally about said form.

4. The method of building tires which comprises forming an endless, cross-sectionally flat band of stretchable tire-building material, stretching said band circumferentially by applying mechanically-produced forces to its outer face only, leaving its inner face unobstructed while maintaining it in substantially circular form, and releasing said stretched band upon a form of substantially greater circumference than the normal circumference of the band so that the contraction of the band shapes it laterally about said form.

5. The method of building tires which comprises forming an endless band of stretchable tire-building material, stretching said band circumferentially by applying mechanically-produced forces to its outer face only, leaving its inner face unobstructed while maintaining it in substantially circular form, and permitting the band to contract upon a core of substantially greater circumference than the normal circumference of the band, said band being permitted to contract simultaneously throughout substantially its entire circumference so as to shape it uniformly about said core.

6. The method of building tires which comprises forming an endless, cross-sectionally flat band of tire-building material, stretching said band circumferentially by substantially equal radial forces applied at stepped positions about its circumference without obstruction of its inner face while maintaining it substantially flat in cross-section and substantially circular in form, and releasing said stretched band upon a form of substantially greater circumference than the normal circumference of the band, so that the contraction of the band shapes it laterally about said form.

7. Tire-building apparatus comprising an annular core of tire-shaped cross-section and means for stretching an endless band of tire building material thereover including means of engaging the outer face only of said band and maintaining the band in substantially flat cylindrical form during the stretching operation.

8. Tire-building apparatus comprising an annular core of tire-shaped cross-section and means for stretching an endless, cross-sectionally flat band of tire-building material thereonto while maintaining said band substantially flat in cross section and its inner surface free of obstruction.

9. Tire-building apparatus comprising an annular core of tire-shaped cross-section and a substantially circular series of members adapted to engage the outer face of a band of tire-building material at intervals about its circumference to hold it in a stretched condition throughout its entire width while leaving its inner face unobstructed, said series of members being positionable about said tire-forming core.

10. Tire-building apparatus comprising an annular core of tire-shaped cross-section and a substantially circular series of suction-applying members adapted to engage the outer face of a band of tire-building material at intervals about its circumference to hold it in a stretched condition throughout its entire width, said series of members being positionable about said tire-forming core.

11. Tire-building apparatus comprising a tire-forming support, a series of members adapted to engage the outer face of a band of tire-building material at intervals, and means for spreading said series of members to stretch said band, said series of members being positionable about said tire-building support.

12. Tire-building apparatus comprising a tire-building support, a series of suction-applying members adapted to engage the outer surface of a band of tire-building material, and means for spreading said series of suction-applying members to stretch said band, said series of suction applying members being positionable about said tire-forming support.

13. Tire-building apparatus comprising a tire-forming support and means for applying an endless band of tire-building material thereto, said band-applying means comprising a substantially circular series of suction-applying members for engaging the band, a fluid conduit, slip-joints connecting said suction-applying members with said fluid conduit, and means for extending and retracting said slip-joints to spread said suction-applying members and thereby stretch said band.

14. Tire-building apparatus comprising a tire-forming support, and means for applying an endless band of tire-building material thereto, said band-applying means comprising a hub-member positionable adjacent and substantially coaxial with said tire-forming support, a substantially circular set of overhanging band-engaging arms mounted on said hub member and movable relatively thereto, the overhanging portions of said arms being adapted to surround said tire-forming support when said hub-member is so positioned, means on said arms for engaging the outer face of said band, and means for spreading said set of arms to stretch a band engaged by said arms.

15. Tire-building apparatus comprising a tire-forming support and means for applying an endless band of tire-building material thereto, said band-applying means comprising a hub-member positionable adjacent and substantially coaxial with said tire-forming support, and overhanging suction-applying means on said hub-member adapted to engage the outer surface of said band to hold it stretched by suction, said overhanging suction-applying means being adapted to surround said tire-forming support when said hub-member is positioned as stated.

16. Tire-building apparatus comprising a tire-forming support and means for applying an endless band of tire-building material thereto, said band-applying means comprising a hub-member positionable adjacent and substantially coaxial with said tire-forming support, a set of overhanging suction-applying members mounted on said hub-member and movable with respect thereto, the overhanging portions of said suction-applying members being adapted to hold said band stretched by suction and to surround said tire-forming support when said hub-member is positioned as stated, and means for moving said suction-applying members with respect to said hub-member to spread them and thereby stretch a band engaged thereby.

17. Tire-building apparatus comprising a tire-forming support and means for applying an endless band thereto, said means including a hub member, a circular series of L-shaped, band-engaging members having radial arms slidably mounted on said hub member and axially disposed arms at their outer ends adapted to be disposed about said tire-forming support, a ring rotatably mounted on said hub member, and toggle links connecting said ring with said band-engaging members.

18. Tire-building apparatus comprising a tire-forming support and means for applying an endless band of tire-building material thereto, said band-applying means comprising a hub-member positionable adjacent and substantially coaxial with said tire-forming support, a set of overhanging band engaging members slidably mounted on said hub-member, their overhanging portions being adapted to surround said tire-forming support when said hub member is positioned as stated, a ring rotatably mounted on said hub member, and toggle links connecting said ring with said band-engaging members.

19. Tire-building apparatus comprising a tire-forming support and means for applying an endless band of tire-building material thereto, said band applying device comprising a hollow hub-member positionable adjacent and substantially coaxial with said tire-forming support, means for exhausting the air from said hollow hub-member, radial sleeves on said hub-member in communication with its internal cavity, overhanging suction members having stems slidably mounted in said sleeves, and means for sliding said suction members in said sleeves.

20. Tire-building apparatus comprising a tire-forming support and means for applying an endless band of tire-building material thereto, said band-applying device comprising a hollow hub-member positionable adjacent and substantially coaxial with said tire-forming support, means for exhausting the air from said hollow hub-member, radial sleeves on said hub-member in communication with its internal cavity, overhanging suction members having stems slidably mounted in said sleeves, a ring concentrically and rotatably mounted on said hub-member, and toggle links connecting said ring with said suction members.

21. Tire-building apparatus comprising a tire-forming support mounted on a horizontal axis and means for applying an endless band of tire-building material thereto, said band-applying means comprising an overhead support adjacent said tire-forming support, a frame structure hanging from said overhead support and adapted to be swung thereon in a direction transverse to the axis of said tire-forming support and to be run bodily in a direction substantially parallel with said axis, and means on said frame structure adapted to hold said endless band stretched and to carry it into position about said tire-forming support.

22. Tire-building apparatus comprising a tire-forming support, a band supporting drum, and means adapted to engage the outer face of an endless band mounted on said drum to hold said band in a stretched condition as it is moved from said drum to said tire-forming support, and guiding or positioning means for said band-engaging means adapted to regulate the latter's movement as it is presented successively to said drum and said tire-forming support.

23. Tire-building apparatus comprising an overhead support, a rigid, hanging fluid conducting structure so attached to said support as to be swung about it as a center in one plane and to be moved bodily in a direction transverse to said plane while supported by said overhead support, means for exhausting air from said structure in its several positions, and a suction device on the lower end of said structure adapted to hold an endless band of tire-building material expanded by suction applied to the outer face of said band.

24. A method for use in the manufacture of tires, comprising the steps of forming tire material into a ring, expanding the ring, holding the ring in expanded condition by vacuum applied to the outer surface of the ring, placing the ring over a tire form, and relieving the vacuum so that the ring may contract about the form.

25. A method for use in the manufacture of tires, comprising the steps of forming tire material into a ring, expanding the ring, holding the ring by its outer surface leaving the inner surface free, placing the ring of expanded material over a tire form, and releasing it about the form.

26. An apparatus for use in the manufacture of tires, comprising a drum and a core, a carrier movable from the drum to the core, and means associated with the carrier to pick a ring of tire material from the drum and hold it with its inner surface free.

27. An apparatus for use in the manufacture of tires, comprising a drum and a tire form, an annular carrier movable from the drum to the form, and means associated with the carrier to hold a ring of tire material by its outer surface so as to leave its inner surface free to be placed over the form.

In witness whereof I have hereunto set my hand this 8th day of July, 1922.

JOHN R. GAMMETER.